(12) United States Patent
Gayrard et al.

(10) Patent No.: US 7,131,484 B2
(45) Date of Patent: Nov. 7, 2006

(54) MODULAR ARCHITECTURE FOR THERMAL CONTROL IN A SPACECRAFT

(75) Inventors: Jean-Didier Gayrard, Toulouse (FR); Eric Belis, Toulouse (FR); Frédéric Michard, Saint Lys (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/676,117

(22) Filed: Oct. 2, 2003

(65) Prior Publication Data

US 2004/0188568 A1 Sep. 30, 2004

(30) Foreign Application Priority Data

Oct. 3, 2002 (FR) .................................. 02 12240

(51) Int. Cl.
*F28F 7/00* (2006.01)
(52) U.S. Cl. ..................................... 165/41; 165/104.26
(58) Field of Classification Search ................. 165/41, 165/104.26, 185; 244/163, 158 R, 159
See application file for complete search history.

(56) References Cited

U.S. PATENT DOCUMENTS

| | | | | |
|---|---|---|---|---|
| 4,420,035 | A | * | 12/1983 | Hewitt ......................... 165/273 |
| 4,738,304 | A | * | 4/1988 | Chalmers et al. ............ 165/281 |
| 4,832,113 | A | * | 5/1989 | Mims et al. ................... 165/41 |
| 4,890,668 | A | * | 1/1990 | Cima ...................... 165/104.25 |
| 5,036,905 | A | * | 8/1991 | Eninger et al. ................ 165/41 |
| 5,101,884 | A | * | 4/1992 | Leidinger ..................... 165/41 |
| 5,117,901 | A | * | 6/1992 | Cullimore ..................... 165/86 |
| 5,271,582 | A | | 12/1993 | Perkins et al. |
| 6,481,670 | B1 | * | 11/2002 | Bigelow et al. ............. 244/163 |
| 6,626,231 | B1 | * | 9/2003 | Cluzet et al. .................. 165/41 |

FOREIGN PATENT DOCUMENTS

EP 0 995 677 A2 4/2000

OTHER PUBLICATIONS

Won Soon Chang et al: "Advanced Two-phase Thermal Management in Spacecraft" Proceedings of the Intersociety Energy Conversion Engineering conference, vol. 2, Aug. 12, 1990, pp. 121-129, XP010301290.
Schweickart R et al: "Testing of a controller for a hybrid capiallary pumped loop thermal control system" Proceedings of the Intersociety Energy Conversion Engineering Society, Aug. 6, 1989, pp. 69-74. XP010089652.

* cited by examiner

*Primary Examiner*—Teresa J. Walberg
(74) *Attorney, Agent, or Firm*—Sughrue Mion, PLLC (57) ABSTRACT

Equipment (20, 20a) includes at least one electronic module (21) for the payload or the platform of a satellite (50) adapted to be supported by a structure (24) of the satellite, the satellite structure including a heat transfer system (44, 10) for transporting dissipated heat to a radiator (51). The equipment includes at least transfer devices (22, 30, 31, 34, 341–345) for transferring heat dissipated by the electronic module and connectors (28, 34, 35, 37) for connecting the transfer devices to the heat transfer system (10) of the structure in such a manner as to enable the supply of heat exchange fluid (16) to the transfer devices and the transfer of heat dissipated by the electronic module to the radiator. A satellite structure includes an arrangement of equipments and a communication system for satellites, with particular application to the new generation of satellites with electrical propulsion.

24 Claims, 6 Drawing Sheets

FIG_1a

FIG_1b

FIG_6

FIG_2

FIG_3

FIG_4

FIG_4a

FIG_5

FIG_5a

FIG_7

FIG_8

FIG_9a

FIG_9b

FIG_10a

FIG_10b

MODULAR ARCHITECTURE FOR THERMAL CONTROL IN A SPACECRAFT

The field of the present invention is that of spacecraft and more particularly that of thermal control of satellite equipment incorporating electronic modules.

Figure 1A:
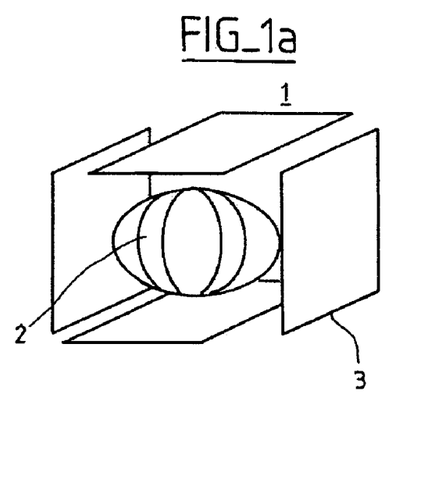
figure 1a models the satellite with fuel tanks and figure 1b models the satellite with electrical propulsion.

Satellites of the current generation have been designed so that the electronic equipment of the payload and the avionic equipment of the platform are packaged in metal boxes that are mechanically mounted flat on structural panels (walls and partitions) of the satellite. As shown in figure 1a, the satellite resembles a cube 1, the center 2 being occupied by fuel tanks, walls 3 (i.e. the structural panels) forming the six faces of the satellite, and partitions, not shown, connecting the walls to the storage tanks.

The electronic and avionic equipments are interconnected by a complex wiring harness that carries the electrical power supply, service module signals, radio-frequency or microwave payload signals in the case of a telecommunication satellite, etc. The wiring harnesses represent a penalty from the points of view of mass, design and testing time, and cost.

Figure 1B:
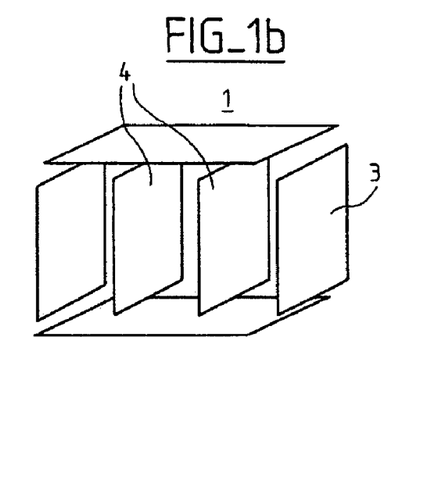

The above design, which stems from the large overall size of the tanks, is no longer pertinent for new satellites using electrical propulsion, which need less fuel for injection into orbit, stationkeeping and attitude control. The tanks then being smaller, a large internal volume is available for internal panels 4 for laying out additional payload and avionic equipments.

The reorganization of the volume freed up in this way must be exploited to evolve toward a modular architecture of the thermal, electrical, and mechanical systems of the satellite, standardization of the layout of the payload, and reduction of costs. To be more specific, the arrangement of the electronic equipment and the design of their thermal control arrangements and connecting harnesses, that until now have been based on a planar approach, will evolve toward a three-dimensional approach.

The research and development teams of the Applicant have been particularly concerned with the problem of thermal control of the equipments in the above context.

When a satellite is operating in orbit, the onboard equipments dissipate a large amount of heat. To prevent overheating of the satellite, it is necessary to provide a heat transfer system capable of evacuating the heat from the interior of the satellite into space.

A number of systems for effecting this heat transfer are known in the art.

They comprise one or more fixed or deployable radiators connected to the satellite and provided with a heat transfer system. The principle of the heat transfer system is always based on the use of a fluid circulating between a hot region, i.e. the region in which heat is dissipated, and a cold region, i.e. the region in which heat absorbed by the fluid is transferred to the external medium.

A first type of prior art system is the heat pipe, which comprises a metal (for example aluminum) tube in which a heat-exchange fluid (generally ammonia) flows and uses the properties of two-phase liquid-vapor flow and the capillary properties of liquids. Thus a heat pipe is a closed two-phase system in which vapor generated in the hot region (referred to as the evaporation region) is aspirated toward the cold region (where the pressure is lower), where it condenses on the metal wall of the tube. The liquid phase of the fluid used runs along the metal wall of the tube in the opposite direction to that in which the vapor phase of the fluid flows, the latter remaining confined to the center of the tube. This return movement of the fluid along the wall is obtained by means of a capillary structure (wick or longitudinal grooves) which connects the two ends of the tube and serves simultaneously as a capillary pump and as a separator of the liquid and vapor phases.

Heat transfer systems using heat pipes, although widely used in the field of satellites, nevertheless give rise to a number of problems.

Firstly, their performance in terms of heat transport capacity is limited to a few hundred W.m. Thus for high-power telecommunication satellites, these systems are inadequate and ill-suited to the heat paths and distances between the hot and cold sources.

Furthermore, for the thermal tests to be carried out on the ground, it is necessary for the heat pipes to be horizontal or to have the evaporation regions below the condensation regions, as otherwise the liquid is obliged to rise up by capillary action, against the force of gravity.

Thus it is preferable to use active single-phase or two-phase fluid loop systems in which a pump circulates the fluid.

In single-phase fluid loop systems, the heat exchange fluid (freon, water, ammonia, etc.) absorbs the heat dissipated by the equipment, which increases its temperature, and rejects that heat when it cools in one or more radiators. The fluid is circulated by a mechanical pump.

Although it absorbs much more heat than is possible using heat pipes, two-phase fluid loop systems may be preferred over this type of single-phase fluid loop system, in particular for high-power satellites.

Like heat pipes, two-phase fluid loop heat transfer systems using capillary pumping (known as capillary pumped loops (CPL) or LHP) use the latent heat of evaporation of the fluid to absorb and reject heat. Thus the heat exchange fluid changes state as it circulates in the loop. It evaporates on absorbing heat dissipated by the equipment in the evaporator and condenses on rejecting that heat into one or more condensers of the radiator. The fluid is circulated by a capillary pump of the evaporator. The vapor and liquid phases are separated, except in the condenser, where they flow in the same direction, as opposed to heat pipes, in which the two phases flow in opposite directions in the same tube.

In terms of heat transfer capacity, this type of system is much more efficient than heat pipes for a much more limited capillary structure (only the evaporator has a capillary pumping structure).

In the case of single-phase loops, the pumping is simple mechanical pumping, while for two-phase loops capillary pumping can handle some or all of the heat transfer from the evaporator to the condenser. Thus the fluid loops are mechanically pumped single-phase loops, or capillary pumped two-phase loops, or mechanically pumped two-phase loops, depending on the target performance.

Finally, for the highest power levels, mechanically pumped two-phase loops appear most suitable. They combine the advantages of two-phase and single-phase loops without their respective drawbacks. The service life of the pumps and their complex implementation nevertheless still limit their use.

In the light of the foregoing, the objective of the present invention is therefore to develop:

an architecture of service module electrical, mechanical and thermal systems enabling the use of modular and standard interfaces with the payload and platform electronic equipments of a spacecraft, and a modular and standardized (i.e. non-dedicated) interface for the service module electrical, mechanical and thermal systems of the payload and platform electronic equipments of the spacecraft.

The emphasis is on thermal control of the electronic equipments of a spacecraft such as a satellite, by a service module thermal system, given the heat transfer systems routinely used, and described above, and in a manner that enables modular design of the equipments concerned and standardization of the support panels.

To this end, the invention consists in equipment including at least one electronic module for the payload or the platform of a satellite adapted to be supported by a structure of said satellite, the satellite structure including a heat transfer system for transporting dissipated heat to a radiator, characterized in that said equipment includes at least transfer means for transferring heat dissipated by the electronic module and connector means for connecting said transfer means to said heat transfer system of the structure in such a manner as to enable the supply of heat exchange fluid to said transfer means and the transfer of heat dissipated by the electronic module to the radiator.

Equipment according to one embodiment of the invention includes a plurality of transfer means and a plurality of connector means adapted to be connected to a corresponding plurality of heat transfer systems with their own specific power dissipation capacity and temperature range regulation capacity.

In one embodiment, the heat transfer system is of the single-phase fluid loop type and said transfer means comprise a pipe conformed to have an optimum common surface with the module and having two ends to which are articulated said connector means for the connection to said heat transfer system of the structure.

In one embodiment, said ends are at the level of a bottom plane of contact of the equipment with the structure and in that the heat transfer system of the structure includes branch connections whose ends have openings at the level of a top plane of contact of the structure with the equipment so as to cause the corresponding openings to coincide when fixing the equipment to the structure.

In one embodiment, said pipe continues a predetermined distance beyond said openings outside the equipment thereby forming external segments.

In one embodiment, the cooperation between the equipment and the structure (24) is effected by insertion of the segments inside respective branch connections.

In one embodiment, the connector device includes a locking/unlocking device that selectively blocks and authorizes circulation of fluid in the pipe.

In one embodiment, the heat transfer system is of the two-phase fluid loop type and the equipment includes:
an evaporator assembly comprising at least one tube for supplying the assembly with heat-exchange fluid in the liquid state, at least one external enclosure of the evaporator tube adapted to have an optimum surface with the module to collect vapor generated on the exterior surface of the tube when the module is dissipating heat, and a vapor manifold, and
connector means for the tube and the manifold adapted to connect them respectively to a supply pipe of heat-exchange fluid from a tank and to a vapor transport line conveying vapor to the condenser of the heat system.

In one embodiment, the module includes connecting means for connecting it to signal transport means situated in the structure and adapted to convey:
an electrical power supply providing various voltages for the equipment,
and/or service module signals such as those for acquiring telemetry from the equipments, for controlling the equipments, time references, and frequency references, and/or payload signals such as microwave, optical and digital signals.

In one embodiment, said signal transport means employ optical technology and the connection means include microwave/optical converter means.

The invention also provides a satellite structure characterized in that it supports equipment according to the invention.

In one embodiment, the structure is provided with mechanical, thermal and electrical connection means adapted to connect a plurality of radiators.

The invention also provides an arrangement of equipments for a satellite structure according to the invention, characterized in that each radiator is associated with a group of equipments corresponding to a specific temperature and therefore necessitating appropriate cooling.

The invention also provides a communication system for a satellite, characterized in that it includes at least one equipment according to the invention and a support structure for said equipment according to the invention.

In one embodiment, said system includes:
a cross-connect unit for payload signals,
a service module subsystem,
a power supply subsystem, the latter being respectively connected to said signal transport means.

In one embodiment, the cross-connect unit includes means for statically or dynamically programming the module.

In one embodiment, to convey optical signals and high-level microwave signals that have been converted or are intended to be converted into the optical domain, said connection means of the equipment include microwave/optical converter means, said transport means include at least one optical fiber, and the cross-connect unit uses optical technology.

Other features and advantages of the present invention will become apparent on reading the following description of one embodiment of the invention provided by way of illustrative and nonlimiting example.

In the following figures.

In all these figures, items with identical functions carry the same reference numbers.

Figure 2:
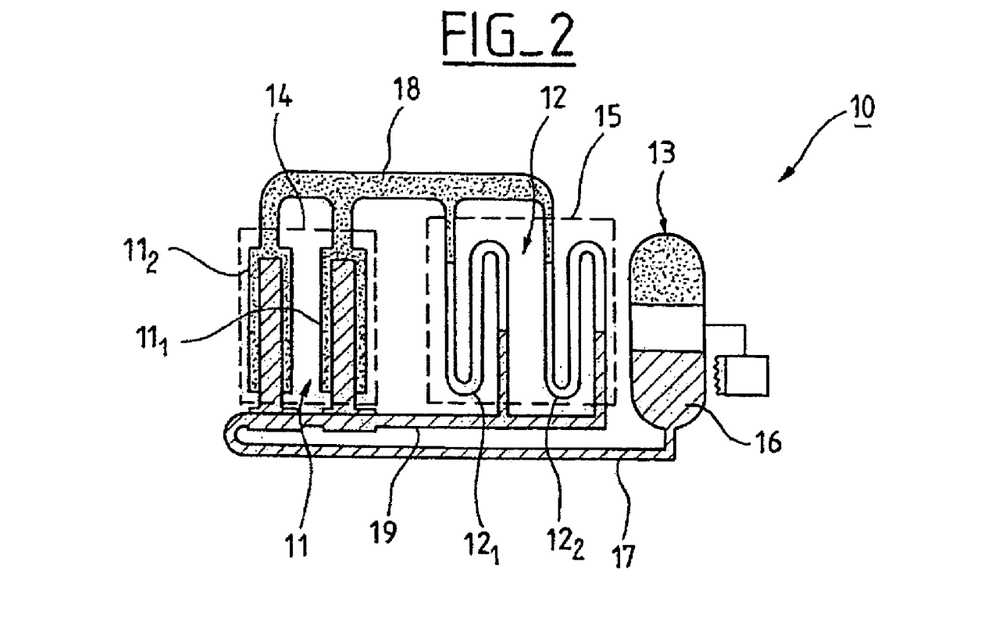
FIG. 2 shows the principle of the two-phase capillary pumped fluid loop.

FIG. 2 shows a fluid loop 10 of the capillary pumped loop (CPL) type comprising an evaporator 11, a condenser 12, and a pressurizer tank 13. There are also shown diagrammatically and in chain-dotted outline the heat source 14, i.e. the equipment (not shown) dissipating heat on board a satellite, in the vicinity of which the evaporator 11 is located, and the heat evacuation region 15 on a deployable radiator panel (not shown) of the satellite, in the vicinity of which the condenser 12 is located.

The tank 13 of heat exchange fluid 16, for example ammonia, feeds the loop 10 with fluid via a pipe 17. The fluid 16, in the liquid state symbolized by cross-hatching in FIG. 2, enters the evaporator 11, in which it evaporates. The vapor generated in this way (symbolized by dots in FIG. 2) flows toward the condenser 12 via a transport line 18.

The vapor is then condensed into liquid inside the condenser 12 and returns toward the evaporator via a transport line 19.

The evaporator 11 has a capillary internal structure (not shown). It is formed of two evaporator tubes $11_1$, $11_2$ connected in parallel and having longitudinal and circumferential grooves on their inside surface extending from one end to the other of their length. Thus the liquid reaching the evaporator 11 is aspirated radially through the capillary wick and is heated as it moves at a very low flowrate toward the outside of the evaporator, where the source of the heat to be dissipated is located. It then evaporates on the surface of the evaporator, where menisci that initiate the capillary force form. The increase of capillary pressure in the wick is proportional to the surface tension of the fluid 16 and inversely proportional to the equivalent radius of the menisci.

On leaving the capillary wick of the evaporator 11, the vapor is therefore collected in the external enclosure of the evaporator 11, in direct contact with the heat source 14. Because of the capillary pumping pressure in the loop 10, the vapor is then directed into the vapor line and flows to the condenser 12, which is formed of two condenser circuits $12_1$ and $12_2$ connected in parallel.

The pressurizer tank 13 serves in particular to regulate the operating temperature of the loop 10 and of the priming pump for the loop 10.

The transport lines 18 and 19 are simple tubes, inducing low pressure losses and very light in weight; they can be bent very easily because of their intrinsic flexibility. They are generally made of aluminum alloy or steel and have an inside diameter from 4 to 10 mm.

Figure 3:
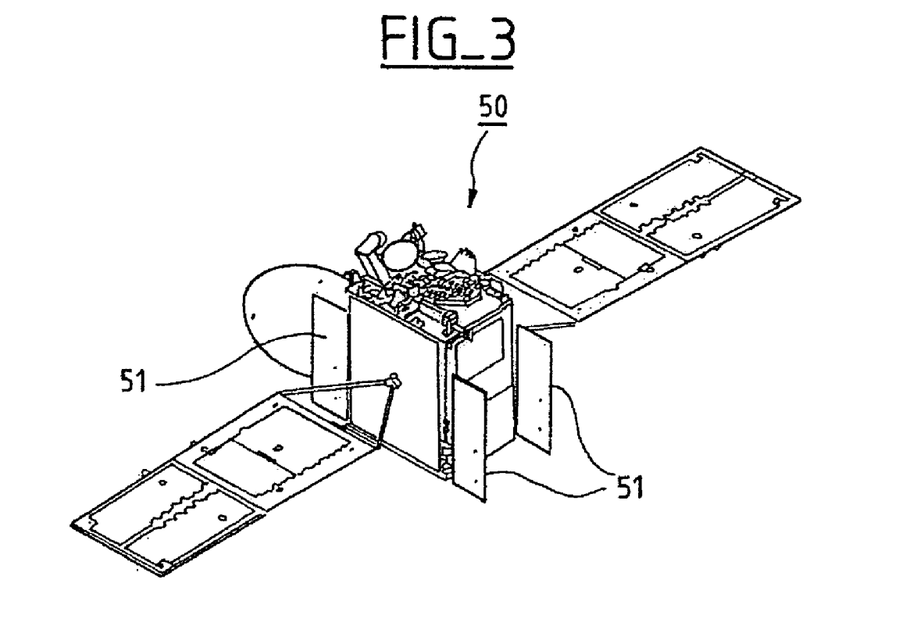
FIG. 3 represents a satellite with deployable radiators.

At present, the cooling radiator is conventionally located on panels. Thus FIG. 3 shows deployable radiators 51 in a satellite 50 (only three radiators can be seen in FIG. 3). The deployable radiators shown are single-panel radiators, to simplify the illustration, but can be replaced by multipanel radiators. Initially (before the satellite is launched into orbit), the panels are folded against each other. After the satellite is launched and placed in orbit, the panels are deployed to constitute a large heat evacuation surface, as is necessary in particular for modern high-power satellites.

Figure 4:
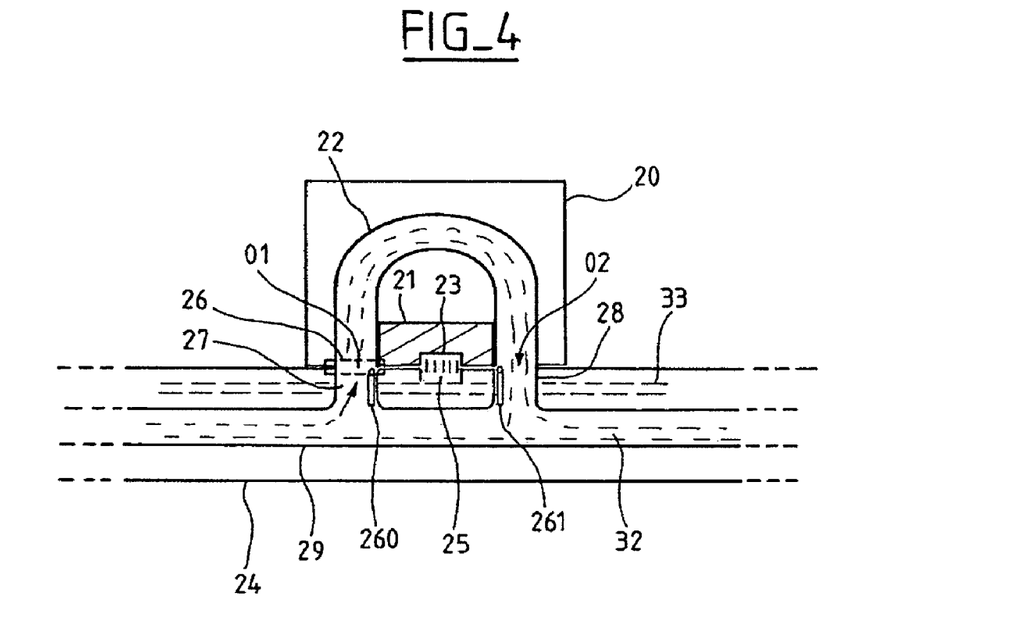
FIG. 4 represents diagrammatically one embodiment of equipment according to the invention adapted to cooperate with a single-phase fluid loop heat transfer system.

FIG. 4 shows diagrammatically one embodiment of an equipment 20 according to the invention adapted to cooperate with a single-phase fluid loop heat transfer system. The equipment 20 is in fact a shielded equipment including an electronic module 21, which can take the form of a simple unit, a plug-in card, or even a component. The modules of the satellite dissipate a quantity of heat that is indexed to the intrinsic efficiency of the modules and which can be high in some high-power modules, such as a high-power amplifier (HPA). To maintain the thermal environment of these modules within temperature ranges compatible with their operation, their performance, and the specified mission duration, it is necessary to provide a heat transfer system for collecting and transporting this heat and evacuating it into space, as explained above.

To this end, a pipe 22 is provided in the equipment 20 and is conformed to have an optimum common surface with the module 21.

This equipment is intended to be disposed on a support structure 24 of the satellite and has two openings O1 and O2 respectively corresponding to the ends of the pipe 22. The module 21 is additionally provided with a connector 23. When it is installed, the equipment faces openings corresponding to the openings O1 and O2 and facing a connector 25. The connector 25 is connected to a bus 33 carrying various signals. This bus and the corresponding signals are explained in more detail hereinafter. As will emerge in due course, the bus 33 can be replaced either by a plurality of buses each carrying signals of their own or by an optical fiber.

A connector device 26, shown in only one of the two openings, but present in both in reality, connects the pipe 22 to respective branch connections 27 and 28 connected to the transport line 29 of the heat transfer system. Of course, the connector device is provided with conventional means to provide a perfect connection, such as appropriate seals.

The connector device further includes a locking/unlocking device which locks the branch connections 27, 28 or not according to whether there is equipment present on its roof or not. The locking/unlocking device is represented diagrammatically in FIG. 4 by valves 260, 261 that divert the heat exchange fluid through either the pipe 22 (locked mode with a long loop) or the pump 32 (unlocked mode with a short loop), according to whether the equipment is present or absent.

Figure 4A:
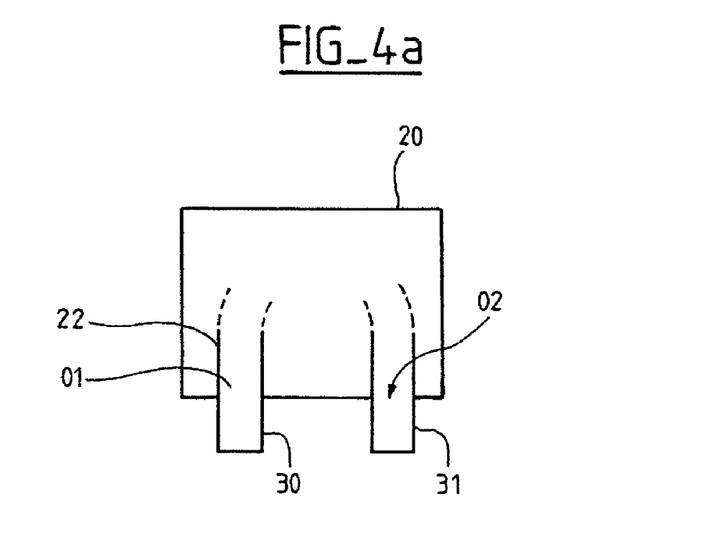
FIG. 4a represents a variant of the FIG. 4 equipment.

In a variant shown in FIG. 4a, the pipe 22 extends a predetermined distance beyond the openings O1 and O2 on the outside of the equipment 20 to form external segments 30, 31. In this variant, the cooperation between the equipment 20 and the structure 24 is not reflected in coincident facing openings but in the insertion of the segments 30, 31 in the respective branch connections 27, 28. The segments 30, 31 are firmly retained in the branch connections 27, 28 by means of a locking/unlocking device 26 of the FIG. 4 type, for example. Of course, in this variant, just as in the FIG. 4 embodiment, the device 26 can be located anywhere, provided that it fulfils its function of shutting off/opening the flow of fluid in the pipe 22.

Producing segments 30, 31 that are flexible and connect to the main heat transfer network or to any other more convenient connection point can advantageously be envisaged.

It will be noted that in the present situation the heat transfer system is of the single-phase fluid loop type. The heat-exchange fluid 32 in the transport line 29 absorbs the heat dissipated by the highly dissipative electronic module 21, its temperature therefore increasing, and transports the power as it cools to reject it to one or more radiators.

Figure 5:
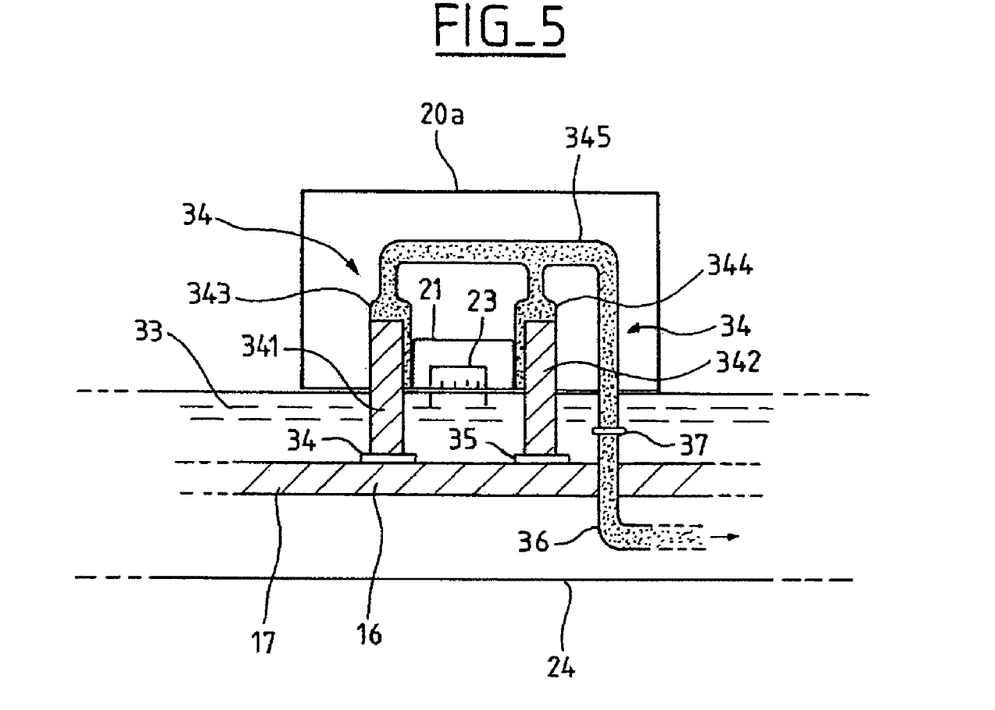
FIG. 5 represents one embodiment of the equipment according to the invention adapted to cooperate with a two-phase fluid loop heat transfer system,
in FIG. 5a the equipment from FIG. 5 is represented decoupled from its support structure.

FIG. 5 shows one embodiment of equipment 20a according to the invention cooperating with a two-phase fluid loop heat transfer system.

Figure 5A:
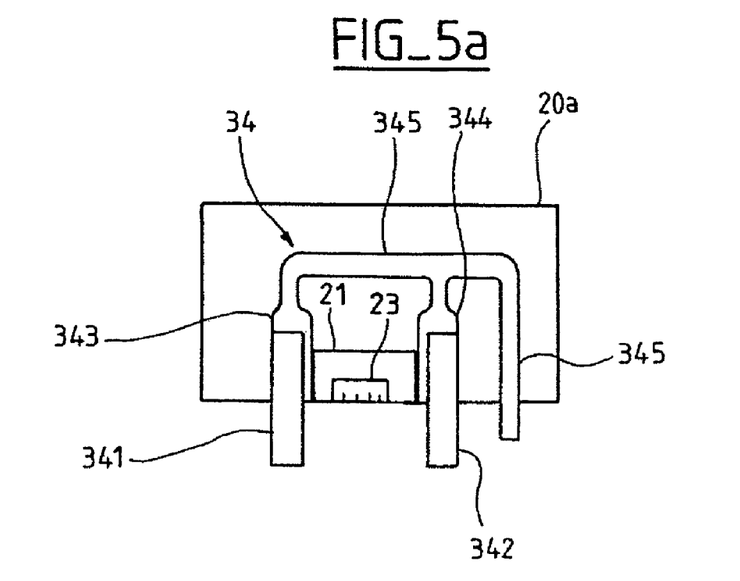

For clarity, the equipment 20a is shown decoupled from its support structure 24 in FIG. 5a.

The module 21 is a potential source of heat and is in the direct vicinity of an evaporator assembly 34. The heat evacuation region on a deployable radiator panel, in the vicinity of which the associated condenser is located, is of course not shown here.

The equipment 20a is fixed to the structure 24 by first connectors 34 and 35 for connecting evaporator tubes 341, 342 to the pipe 17 supplying heat exchange fluid 16 from the tank 13.

Respective external enclosures 343 and 344 of the evaporator tubes 341 and 342 collect vapor generated on the surface of the tubes, in accordance with the operating principles explained in the introduction to this application.

The enclosures 343 and 344 are joined together in the equipment 20a at a pipe 345, referred to for conciseness as a manifold.

The manifold 345 is fixed to a transport line 36 of the structure 24 by means of a connector 37. The vapor collected in the external enclosures 343, 344 in direct contact with the module 21 that is the heat source flows in the vapor line 36 to the condenser of the heat system.

The modular principle stated hereinabove as suitable for the electronic module equipment can also apply to the radiators of the heat transfer system. Thus in an embodiment of the invention that is not shown, the structure of the satellite is provided with standardized mechanical, thermal, and electrical connection means adapted to connect a plurality of radiators. This embodiment is particularly advantageous for cooling equipment that dissipates a great deal of heat or for associating with each radiator a group of equipment units corresponding to a heating temperature of its own and therefore necessitating suitable cooling. This latter application has the advantage that each equipment group can be geographically grouped together on the structure in corresponding relationship to the associated radiator.

The principle of modularity, thus stated, also applies to each equipment; accordingly, in an advantageous variant that is not shown, the equipment 20 has a plurality of pipes 22, each of which can be connected by an interface of O1, O2 type 27, 26 to various pipes 32 connected to heat transfer systems. In this variant, each pipe 32 has a different mode of operation: thus temperature and power are specific to each heat transfer system. As a result, the modules 21 of an equipment are maintained within different temperature ranges.

An equipment of the above kind can then be connected simultaneously to a plurality of loops to dissipate different temperatures and heats for each module: for example, a microwave power module (MPM), which is the combination of a CAMP, an EPC, and a TWT, can have very hot regions (in the vicinity of the TWT), other, colder regions (in the vicinity of the CAMP), and other, temperate regions (in the vicinity of the EPC).

The interfaces, in particular the electrical interfaces, between the equipment modules 21 and the bus or buses 33 transporting payload signals of the structure are described in more detail next.

This bus forming the electrical interface of the structure 24 is standardized and available at the back of the structure in the manner of a "backplane". Its standardization consists, firstly, in permanently defining the position and the nature of the connection and the type and the characteristics of the signals, and, secondly in making all of the existing signals available on the buses, the connected module 21 being responsible for selecting the required signals. As explained hereinafter, the bus 33 supplies electrical power, service module equipment signals for acquiring measurements and controlling the equipment (known as telemetry/telecontrol (TM/TC) signals), time and frequency references, and radio frequency analog or digital, depending on the mission, "payload" signals.

Central units handle the cross-connection of the payload signals carried by the buses. These units are configured statically at mission design time or dynamically during the mission by programming or telecontrol.

Figure 6:
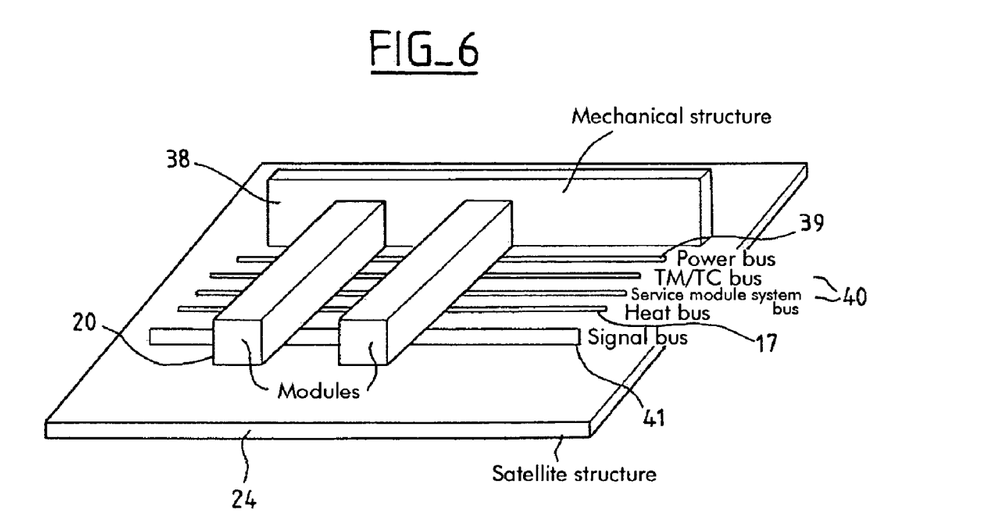
FIG. 6 represents the principle of modularity of the arrangement of equipment relative to various buses of the structure of the satellite in one embodiment of the invention.

FIG. 6 represents the arrangement of the equipments 20 relative to various buses of the structure of the satellite in one embodiment of the invention. The electronic equipment being packaged in screened form or as cards is inserted into a mechanical support structure 38 which is itself firmly fixed to the structure 24, which provides the mechanical retention of the equipments. The modules 21 are connected via their connectors 23 to buses disposed on the support structure 24. The buses group together the various electrical interfaces: an electrical power supply bus 39, a bus 40 for the service module system signals (TM/TC, OL, etc.), the signal bus for the payload signal (microwave, IF, digital, etc.), and the thermal control transport lines, already explained above (heat pipe, single-phase or two-phase fluid loop, etc.).

Figure 7:
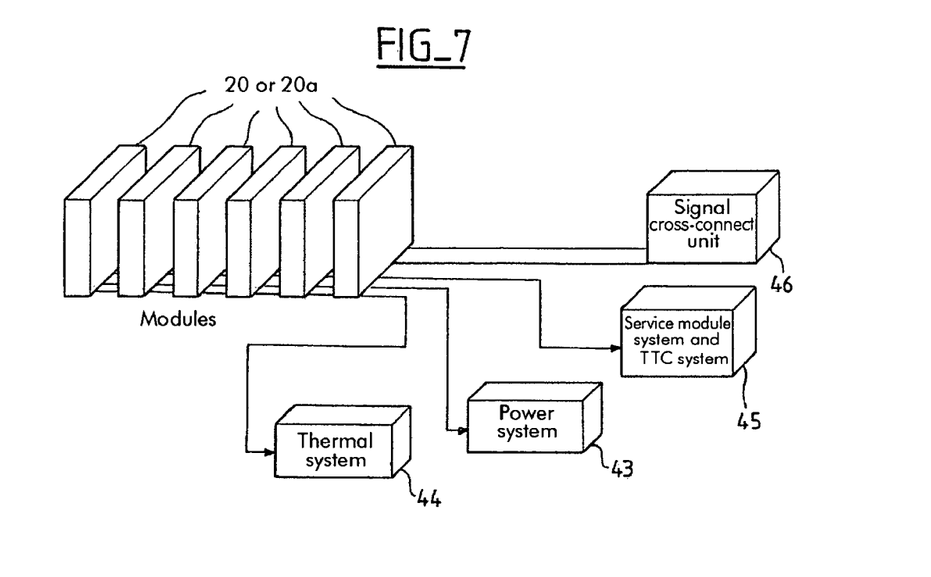
FIG. 7 represents a system enabling the equipment to communicate with the various subsystems of the satellite and the system for cross-connecting the communication signals of the electronic equipment in one embodiment of the invention.

As shown in FIG. 7, in one embodiment of the invention the communication system 42 connects the modules 21 of the equipments 20, 20a via the buses 39–41 and 17 to the subsystems of the satellite: electrical power system 43, thermal control system 44 (also referred to hereinabove as the heat transfer system), service module equipment and TTC system 45, etc. The payload signal bus (microwave, IF, digital, etc.) is connected to a cross-connect unit 46 that defines the functional relationship between modules (exchange of payload signals). Of course, although this is not shown, the cross-connect unit is also connected to the satellite operation control means. In the present application, the expression "cross-connection" refers to routing signals between equipments.

In more detail, the buses are therefore:
the electrical power supply bus 39 that supplies the various voltages to the modules,
the service module bus 40 that carries the TM/TC signals that acquire telemetry and control the modules, time and frequency references, etc.,
the heat bus 17 in the form of a contact surface for the exchange of heat with the module ("dry" thermal connector), or pipes and associated connectors for exchanging thermal fluids (single-phase or two-phase fluid loop), as explained hereinabove, and
the signal bus 41: the low-power and medium-power microwave bus made up of coaxial connectors and cables, the high-level microwave bus made up of waveguides, the optical bus made up of fibers, the low, medium and high bit rate digital bus, etc.

The non-dedication of the service module equipment bus can be based on the invention that is the subject matter of French patent application FR 011 5302 filed 27 Nov. 2001 by the Applicant, whose title in translation is "Dorsal interface, terminal communication interface for spacecraft, and communication network incorporating such interfaces". According to that invention, a single connection by optical fiber then provides access to all the service module equipments.

Figure 8:
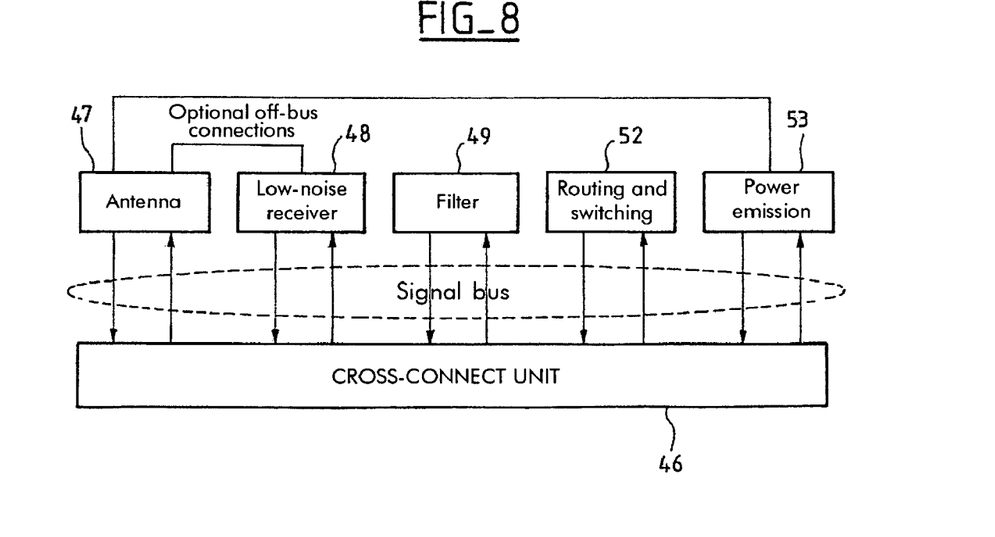
FIG. 8 shows the function of a signal cross-connect unit in one embodiment.

In the case of a telecommunication payload, the signal bus 41 carries low-power, medium-power and high-power microwaves. The cross-connect unit 46 of the bus is statically or dynamically programmed to connect the modules such as the antenna 47, the low-noise amplifiers 48, the receivers, the frequency converters, the filters 49, the demultiplexers, the channel amplifiers, the TWT or SSPA amplifiers 53, the routing and switching systems 52, etc. Thus the cross-connect unit defines the architecture of the payload and manages redundancies.

Figure 9A:
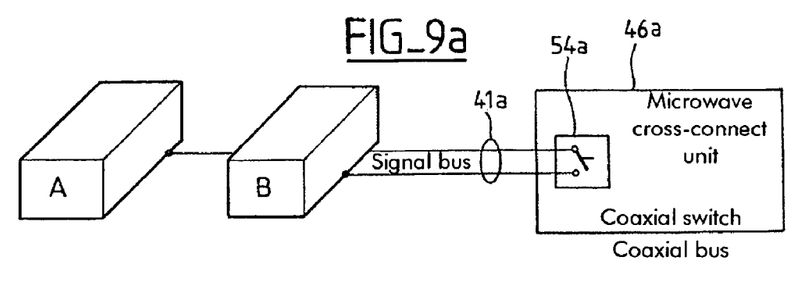
FIGS. 9a and 9b show respective types of technology that can be used for the cross-connect unit according to the invention.
Figure 9B:
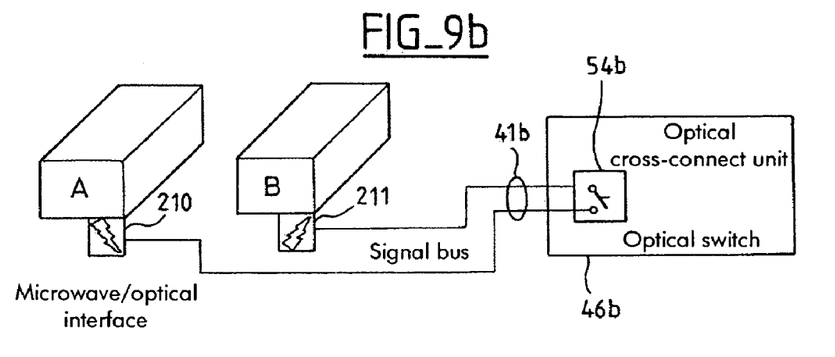

FIGS. 9a and 9b show respective technology types that can be used for the cross-connect unit. FIG. 9a shows a bus 41a made up of coaxial cable. The signal cross-connect unit 46a is a microwave cross-connect unit with a coaxial switch 54a. In FIG. 9b, the non-dedication of the medium-level microwave bus is based on the use of wavelength division multiplex (WDM) optical techniques known in the art. An optical fiber bus 41b conveys between the equipments A and B microwave signals that modulate optical carriers at different wavelengths.

Figure 10A:
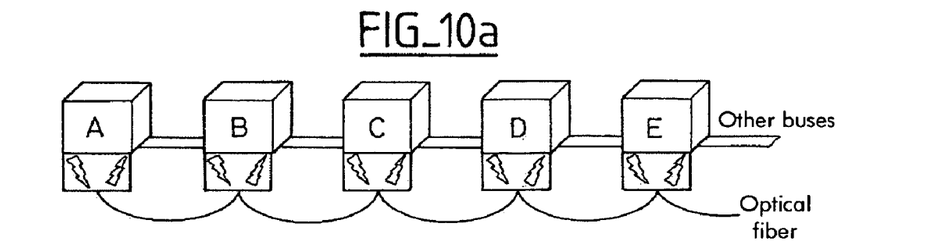
FIG. 10a shows the use of a single optical fiber for the connection between the various equipments and FIG. 10b represents the spectrum obtained by the use of optical wavelength division multiplexing techniques known in the art.
Figure 10B:
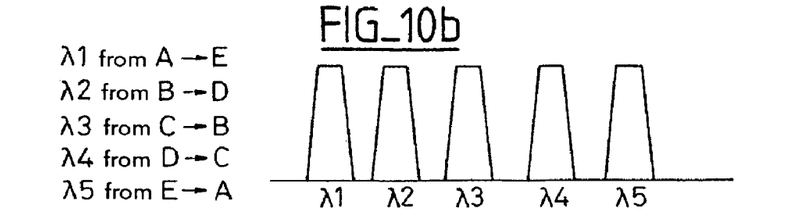

As shown in FIGS. 10a and 10b, the choice of the wavelength of the transmitter (indicated by an arrow pointing outward from the equipments A, B, C, D, E) and that of the receiver (indicated by an arrow pointing inward to the equipments A, B, C, D, E) of the equipments A, B, C, D, E multiplexes the signals onto a single optical medium and addresses the various modules separately at the five wavelengths λ1, λ2, λ3, λ4 and λ5.

The invention provides the following advantages in particular:

better use of the interior volumes of the satellite (use of walls and partitions); being able to place equipments, cords, boxes and racks inside the volume of the satellite allows placement of these equipments in three dimensions (3D), in contrast to the old, planar (2D) architecture, in which the equipments were arranged on plane surfaces corresponding to the north and south dissipative panels; 3D placement optimizes (shortens) the distances between equipments; this has positive consequences for payload performance: reduced losses on the microwave paths, increased transfer bit rates on the digital links, reduced mass of the heat paths, etc., standardization of the equipment mechanical, electrical and thermal interfaces, and the inherent advantages thereof: increased capacity for equipment repair (standard exchange of faulty equipment during AIT), standard equipment test tools (all the interfaces are tested on the same test vehicle, more comprehensive equipment tests (the thermal interfaces are measured and tested), etc., non-dedication of the payload and service module system signal interfaces (one physical interface and a single medium for all the signals), reconfigurability of the payload at the design stage or in service; the architecture of the payload is defined by static or dynamic programming of the bus cross-connect units, standardization of the payload and reduction of costs through the recurrence effect, flexible testability: testing the buses on the satellite platform is independent of testing the modules, and final assembly is facilitated, independent equipment arrangement and operating temperatures: by distributing the equipments on the basis of dissipated power and operating temperatures, optimized operation of modules through the choice of the optimum operating temperature.

Of course, the invention is not limited to the embodiments described. Any means can be replaced by equivalent means without departing from the scope of the invention.

The invention claimed is:

1. Equipment for use on a satellite, the satellite having a support structure that includes a heat transfer system, said equipment comprising:

an electronic module;

at least one heat transfer means (22, 30, 31, 34, 341–345) for transferring heat dissipated by the electronic module; and connector means (26, 34, 35, 37) for connecting said transfer means to said heat transfer system (10) of the structure in such a manner as to enable the supply of heat exchange fluid (16) to said transfer means and the transfer of heat dissipated by the electronic module to a radiator.

2. Equipment according to claim 1, characterized in that it includes a plurality of transfer means and a plurality of connector means adapted to be connected to a corresponding plurality of heat transfer systems with their own specific power dissipation capacity and temperature range regulation capacity.

3. Equipment according to claim 1, characterized in that the heat transfer system is of the single-phase fluid loop type and said transfer means comprise a pipe (22) conformed to have an optimum common surface with the module (21) and having two ends (O1, O2) to which are articulated said connector means for the connection to said heat transfer system of the structure.

4. Equipment according to claim 3, characterized in that said ends are at the level of a bottom plane of contact of the equipment with the structure and in that the heat transfer system of the structure includes branch connections (27, 28) whose ends have openings at the level of a top plane of contact of the structure with the equipment so as to cause the corresponding openings to coincide when fixing the equipment to the structure.

5. Equipment according to claim 3, characterized in that said pipe (22) continues a predetermined distance beyond said openings (O1, O2) outside the equipment thereby forming external segments (30, 31).

6. Equipment according to claim 5, characterized in that the cooperation between the equipment (20) and the structure (24) is effected by insertion of the segments (30, 31) inside respective branch connections (27, 28).

7. Equipment according to claim 3, characterized in that the connector device includes a locking/unlocking device (260, 261) that selectively blocks and authorizes circulation of fluid in the pipe (22).

8. Equipment according to claim 1, characterized in that the heat transfer system is of the two-phase fluid loop type (10) and the equipment includes:

an evaporator assembly (34) comprising at least one tube (341, 342) for supplying the assembly with heat-exchange fluid in the liquid state, at least one external enclosure (343, 344) of the evaporator tube adapted to have an optimum surface with the module to collect vapor generated on the exterior surface of the tube when the module is dissipating heat, and a vapor manifold (345), and connector means (34, 35, 37) for the tube (341, 342) and the manifold (345) adapted to connect them respectively to a supply pipe (17) of heat-exchange fluid (16) from a tank (13) and to a vapor transport line (36) for conveying vapor to the condenser (12) of the heat system.

9. Equipment according to claim 1, characterized in that the module (21) includes connecting means (23) for connecting it to signal transport means situated in the structure (24) and adapted to convey:

an electrical power supply providing various voltages for the equipment, and/or service module signals such as those for acquiring telemetry from the equipments, for controlling the equipments, time references, and frequency references, and/or payload signals such as microwave, optical and digital signals.

10. Equipment according to claim 9, characterized in that said signal transport means employ optical technology and the connection means include microwave/optical converter means (210, 211).

11. A satellite structure, characterized in that it supports equipment according to claim 1.

12. A satellite structure according to claim 1, characterized in that it is provided with mechanical, thermal and electrical connection means adapted to connect a plurality of radiators.

13. An arrangement of equipments for a satellite structure according to claim 12, characterized in that each radiator is associated with a group of equipments corresponding to a specific temperature and therefore necessitating appropriate cooling.

14. A communication system (42) for a satellite, comprising:

the equipment according to claim 10, and
the support structure.

15. A system according to claim 14, characterized in that it includes:

a cross-connect unit (46) for payload signals,
a service module subsystem (45),
a power supply subsystem (43), the latter being respectively connected to said signal transport means.

16. A system according to claim 15, characterized in that the cross-connect unit includes means for statically or dynamically programming the module (21).

17. A system according to claim 14, characterized in that, to convey optical signals and high-level microwave signals that have been converted or are intended to be converted into the optical domain, said connection means of the equipment include microwave/optical converter means (210, 211), said transport means include at least one optical fiber (41b), and the cross-connect unit uses optical technology.

18. A system for a satellite, comprising:
the equipment according to claim 1, and
the support structure.

19. A system for a satellite, comprising:
a radiator;
a support structure, comprising a main fluid conduit containing a fluid that transfers heat to the radiator, and
equipment supported by the support structure, comprising
an electronic module that generates heat,
a module fluid conduit that transfers the heat generated by the electronic module to the main fluid conduit via a fluid connection, and
a connector that couples said module fluid conduit to the main fluid conduit, the connector structured to be decoupled from the main fluid conduit.

20. The system for a satellite of claim 19, wherein the module fluid conduit is provided at a position proximate the electronic module.

21. The system for a satellite of claim 19, wherein the module fluid conduit has a common surface with the electronic module.

22. The system for a satellite of claim 19, wherein the main fluid conduit has a locking device that shuts off the fluid connection between the module fluid conduit and the main fluid conduit.

23. The system for a satellite of claim 19, wherein said connector comprises an inlet connection and an outlet connection, wherein the connections are coupled to the main fluid conduit.

24. The system for a satellite of claim 19, wherein the equipment is a payload of the satellite.

* * * * *